United States Patent
Hsu et al.

(10) Patent No.: US 8,665,406 B2
(45) Date of Patent: Mar. 4, 2014

(54) DISPLAY INTEGRATED CIRCUIT CHIP

(75) Inventors: Sheng-Kai Hsu, Hsin-Chu (TW);
Chih-Hsiang Yang, Hsin-Chu (TW);
Meng-Ying Hsieh, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 292 days.

(21) Appl. No.: 13/354,836

(22) Filed: Jan. 20, 2012

(65) Prior Publication Data

US 2012/0113163 A1 May 10, 2012

Related U.S. Application Data

(62) Division of application No. 12/356,265, filed on Jan. 20, 2009, now abandoned.

(30) Foreign Application Priority Data

Nov. 10, 2008 (TW) .............................. 97143431 A

(51) Int. Cl.
*G02F 1/1345* (2006.01)
(52) U.S. Cl.
USPC ........................................................ 349/149
(58) Field of Classification Search
None
See application file for complete search history.

(56) References Cited

U.S. PATENT DOCUMENTS

| 7,767,474 B2 | 8/2010 | Ko et al. |
| 2008/0036957 A1 | 2/2008 | Hsu et al. |

FOREIGN PATENT DOCUMENTS

| CN | 1585589 A | 2/2005 |
| CN | 1677660 A | 10/2005 |
| CN | 1677660 A | 1/2007 |
| CN | 1909753 A | 2/2007 |
| JP | 60-130721 A | 7/1985 |

*Primary Examiner* — Richard Kim
(74) *Attorney, Agent, or Firm* — Chun-Ming Shih

(57) ABSTRACT

A display IC chip includes a plurality of sides, a plurality of output terminals, two first color short-circuit lines, one second color short-circuit line, one third color short-circuit line, and conductive wires. The two first color short-circuit lines are parallel disposed in the IC chip and coupled to a first output terminal group of the output terminals. The second color short-circuit line is disposed between and parallel with the first color short-circuit lines. The second color short-circuit line is coupled to a second output terminal group of the output terminals. The third color short-circuit line is disposed between and parallel with the first color short-circuit lines. The third color short-circuit line is coupled to a third output terminal group of the output terminals. The conductive wires are coupled the first color short-circuit lines with the first output terminal group do not cross the second and third color short-circuit lines.

5 Claims, 10 Drawing Sheets

DISPLAY INTEGRATED CIRCUIT CHIP

CROSS-REFERENCE TO RELATED APPLICATIONS

This is a divisional application of an application Ser. No. 12/356,265, filed Jan. 20, 2009 now abandoned which is based upon and claims the benefit of priority from the prior Taiwanese Patent Application No. 097143431, filed Nov. 10, 2008. The entirety of the above-mentioned patent applications are hereby incorporated by reference herein and made a part of this specification.

BACKGROUND

1. Technical Field

The present invention generally relates to the field of flat panel display and, particularly, to a glass substrate of flat panel display and a display integrated circuit (IC) chip.

2. Description of the Related Art

Flat panel displays such as a liquid crystal display (LCD) and a plasma display have the advantages of high image quality, small size, light weight and a broad application range, and thus are widely applied on consumer electronic products such as a mobile phone, a notebook computer, a desktop display and a television, and have gradually replaced the traditional cathode ray tube (CRT) displays as the main trend in the display industry.

Referring to FIG. 1, a conventional glass substrate 10 of flat panel display is adapted for disposing a plurality of gate driver integrated circuit (IC) chips 12 and a plurality of source driver IC chips 14 thereon. The glass substrate 10 includes a display area 11 (as denoted by the dashed rectangle in FIG. 1), a plurality of first conductive wires 13a and a plurality of second conductive wires 13b. The display area 11 have a plurality of display elements P, a plurality of gate lines GL and a plurality of data lines DL formed therein. FIG. 1 only shows one display element P, one gate line GL and one data line DL for the purpose of illustration, the display element P is electrically coupled to the gate line GL and the data line DL. The first conductive wires 13a are electrically coupled between output terminals (not shown) of the gate driver IC chips 12 and the display area 11, so as to transmit gate control signals supplied from the output terminals of gate driver IC chips 12 to the display area 11. The second conductive wires 13b are electrically coupled between output terminals (not shown) of the source driver IC chips 14 and the display area 11, so as to transmit data signals supplied from the output terminals of the source driver IC chips 14 to the display area 11. Each of the gate driver IC chips 12 and source driver IC chips 14 includes multiple sides and all of the output terminals thereof only are arranged at one long side of the multiple sides, resulting in an excessive length for the IC chip and a waste of chip area, and a region occupied by each IC chip on the glass substrate 10 is relatively large correspondingly. Accordingly, an increased miniaturization of the glass substrate 10 is hindered to some degree.

BRIEF SUMMARY

The present invention relates to a display integrated circuit chip, can achieve efficient utilization of chip area.

A display IC chip in accordance with an embodiment of the present invention is provided. The display IC chip is for receiving/outputting a first color signal, a second color signal and a third color signal. The display IC chip includes a plurality of sides, a plurality of output terminals, two first color short-circuit line, one second color short-circuit line and one third color short-circuit line. The output terminals are arranged at at least two of the sides, and each of the output terminals is for outputting one of the first color signal, the second color signal and the third color signal. The two first color short-circuit line are parallel disposed in the IC chip and electrically coupled to a first output terminal group of the output terminals which is for outputting the first color signal. The second color short-circuit line is disposed between and parallel with the two first color short-circuit lines. The second color short-circuit line is electrically coupled to a second output terminal group of the output terminals which is for outputting the second color signal. The third color short-circuit line is disposed between and parallel with the two first color short-circuit lines. The third color short-circuit line is electrically coupled to a third output terminal group of the output terminals which is for outputting the third color signal. Conductive wires electrically coupled between the two first color short-circuit lines and the first output terminal group do not cross the second and third color short-circuit lines.

In one embodiment, the sides of the display IC chip include two long sides and two short sides, the output terminals can be arranged at the two long sides, or the two short sides and one of the two long sides, or one of the two long sides and one of the two short sides.

In the above-mentioned embodiments of the present invention, since output terminals of each IC chip are arranged at at least two of the multiple sides thereof, facilitating the efficient utilization and miniaturization of the IC chip, and the drawback of a waste of chip area resulting from excessive length for the IC chip in the prior art is overcome. When the IC chip is applied to a glass substrate of flat display panel, an increased miniaturization for the glass substrate can be achieved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
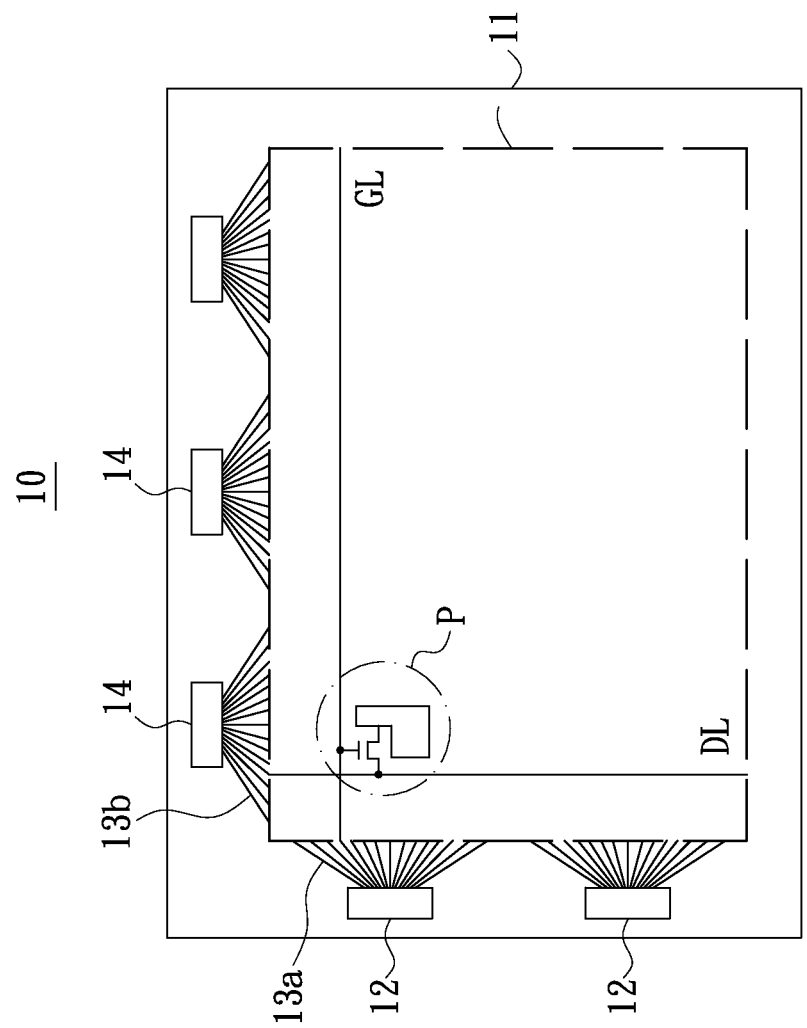
FIG. 1 shows a conventional glass substrate of flat panel display.
Figure 2:
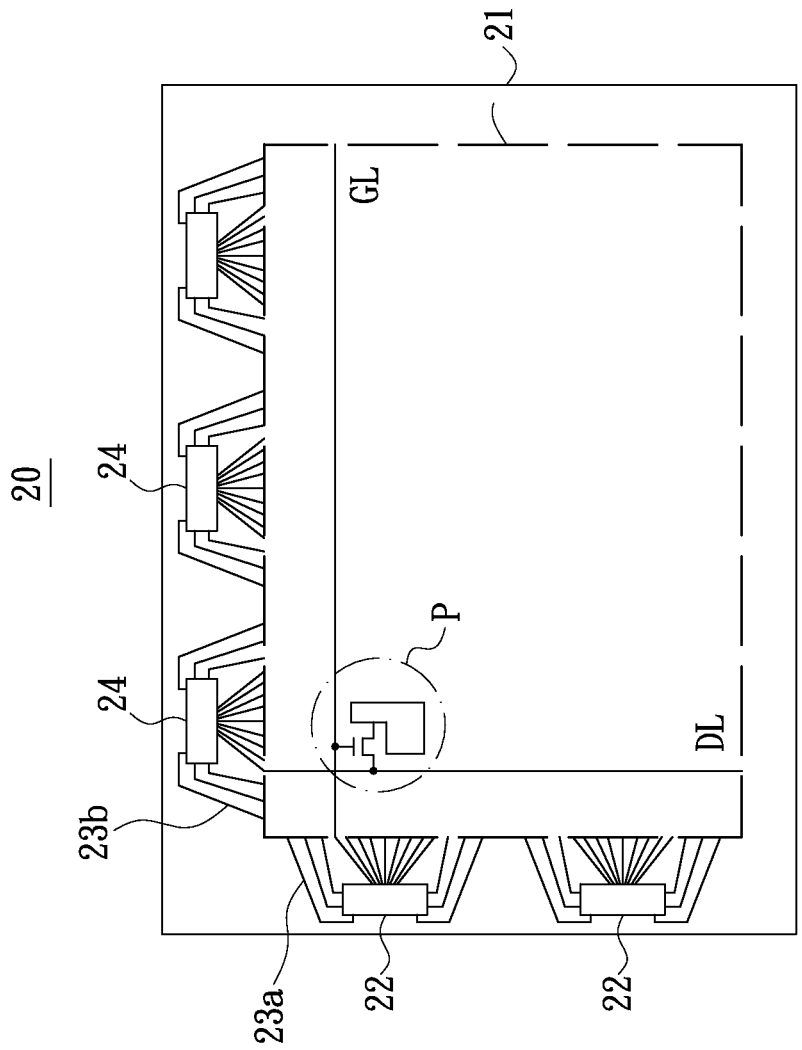
FIG. 2 shows a glass substrate of flat panel display in accordance with an embodiment of the present invention.

Referring to FIG. 2, a glass substrate 20 of flat panel display in accordance with an embodiment of the present invention is provided. The glass substrate 20 is adapted for disposing a plurality of gate driver IC chips 22 and a plurality of source driver IC chips 24 thereon. The glass substrate 20 includes a display area 21 (as denoted by the dashed rectangle in FIG. 2), a plurality of first conductive wires 23a and a plurality of second conductive wires 23b. The display area 21 have a plurality of display elements P, a plurality of gate lines GL and a plurality of data lines DL formed therein. In this embodiment, FIG. 2 only shows one display element P, one gate line GL and one data line DL for the purpose of illustration, the display element P is electrically coupled to the gate line GL and the data line DL. The first conductive wires 23a are electrically coupled between four sides of the gate driver IC chips 22 and the display area 21, so as to transmit gate control signals outputted from multiple output terminals of the gate driver IC chips 22 to the display area 21. The gate control signals are for providing a gate control function applied to the display elements P. The second conductive wires 23b are electrically coupled between four sides of the source driver IC chips 24 and the display area 21, so as to transmit data signals outputted from multiple output terminals of the source driver IC chips 24 to the display area 21. The data signals are for providing display data applied to the display elements P.

Figure 3:
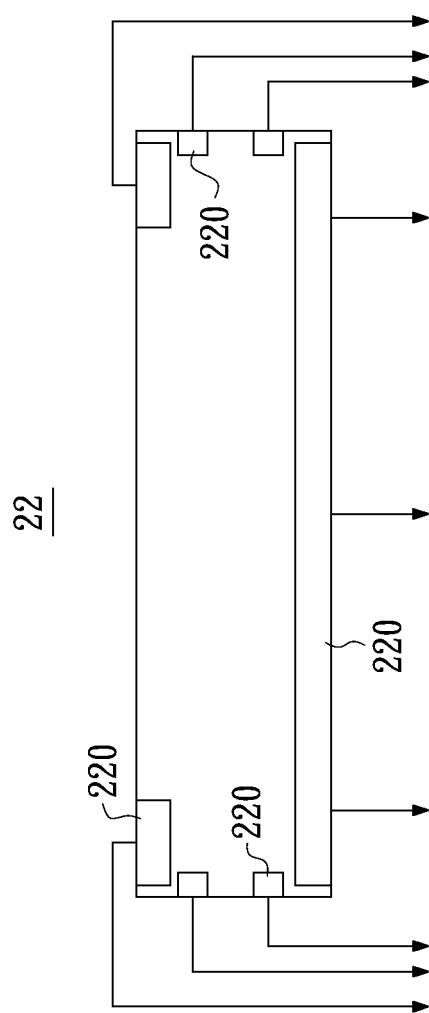
FIG. 3 is an enlarged view of any one of gate driver IC chips in FIG. 2.

Referring to FIG. 3, being an enlarged view of any one of the gate driver IC chips 22 in FIG. 2. As illustrated in FIG. 3, the output terminals 220 of the gate driver IC chip 22 are arranged at four sides of the gate driver IC chip 22, to output the gate control signals to the display area 21 through the first conductive wires 23a electrically coupled thereto. Each solid rectangle in FIG. 3 represents one or multiple output terminals 220. The four sides of the gate driver IC chip 22 include two long sides and two short sides.

Figure 4:
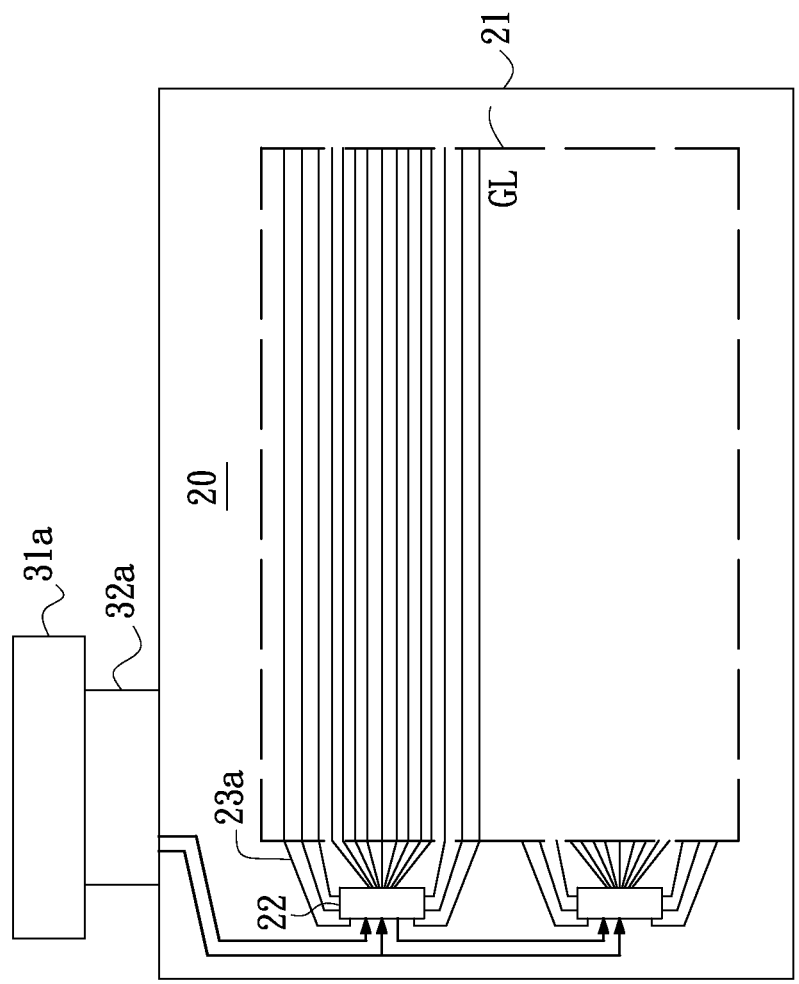
FIG. 4 shows an example of multiple gate driver IC chips in FIG. 2 are connected in cascade.

Referring to FIG. 4, showing an example of the gate driver IC chips in FIG. 2 are connected in cascade. As illustrated in FIG. 4, an external printed circuit board 31a provides a control signal and a power signal to the cascade-connected gate driver IC chips 22 through a flexible printed circuit board 32a. The flexible printed circuit board 32a electrically coupled between the printed circuit board 31a and the glass substrate 20. The printed circuit board 31a generally has a timing controller and a DC-to-DC converter disposed thereon to provide the control signal and the power signal respectively. The timing controller and the DC-to-DC converter are not shown in accompanying drawings.

Figure 5:
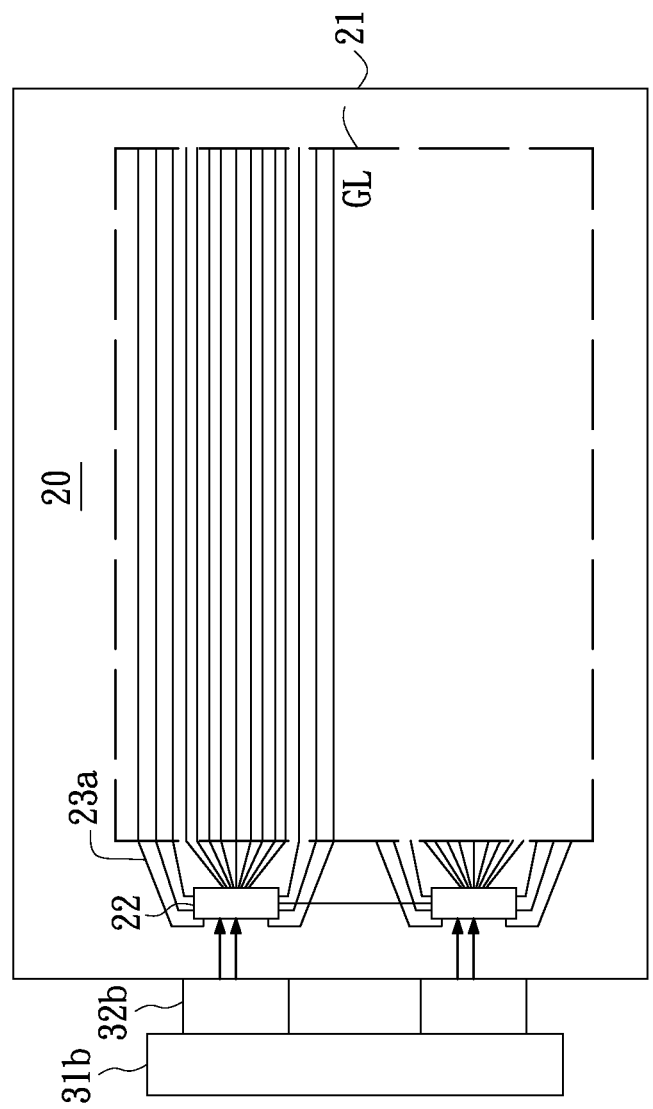
FIG. 5 shows another example of multiple gate driver IC chips in FIG. 2 are connected in parallel.

Referring to FIG. 5, showing another example of the gate driver IC chips 22 in FIG. 2 are connected in parallel. As illustrated in FIG. 5, an external printed circuit board 31b provides control signals and power signals to the parallel-connected gate driver IC chips 22 through respective flexible printed circuit boards 32b. The flexible printed circuit boards 32b are electrically coupled between the printed circuit board 31b and the glass substrate 20. The printed circuit board 31b has a circuit configuration similar to that of the above-mentioned printed circuit board 31a, and thus will not be repeated herein.

Figure 6:
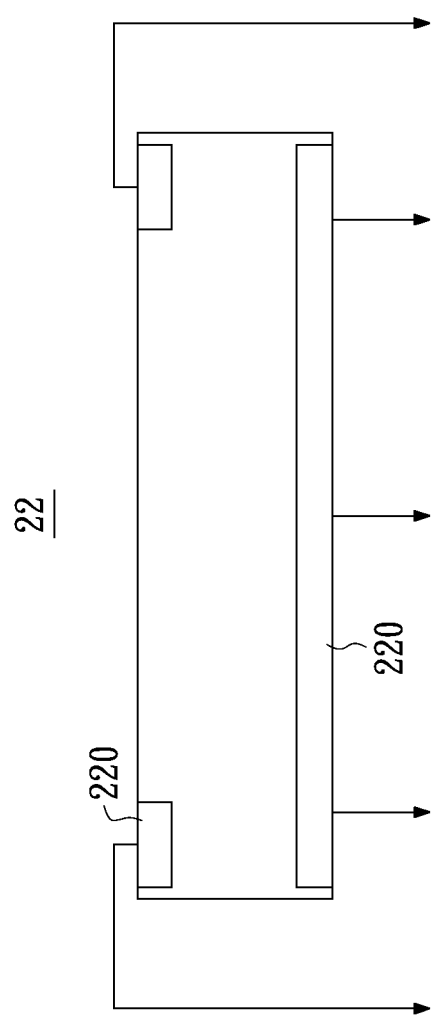
FIG. 6 is an enlarged view of another gate driver IC chip in accordance with an embodiment of the present invention.

Referring to FIG. 6, the output terminals 220 of each of the gate driver IC chips 22 are not limited to be arranged at four sides the gate driver IC chip, and can be only arranged at two long sides of the four sides as illustrated in FIG. 6, or three sides of the four sides. In FIG. 6, each solid rectangle represents multiple output terminals 220.

Figure 7:
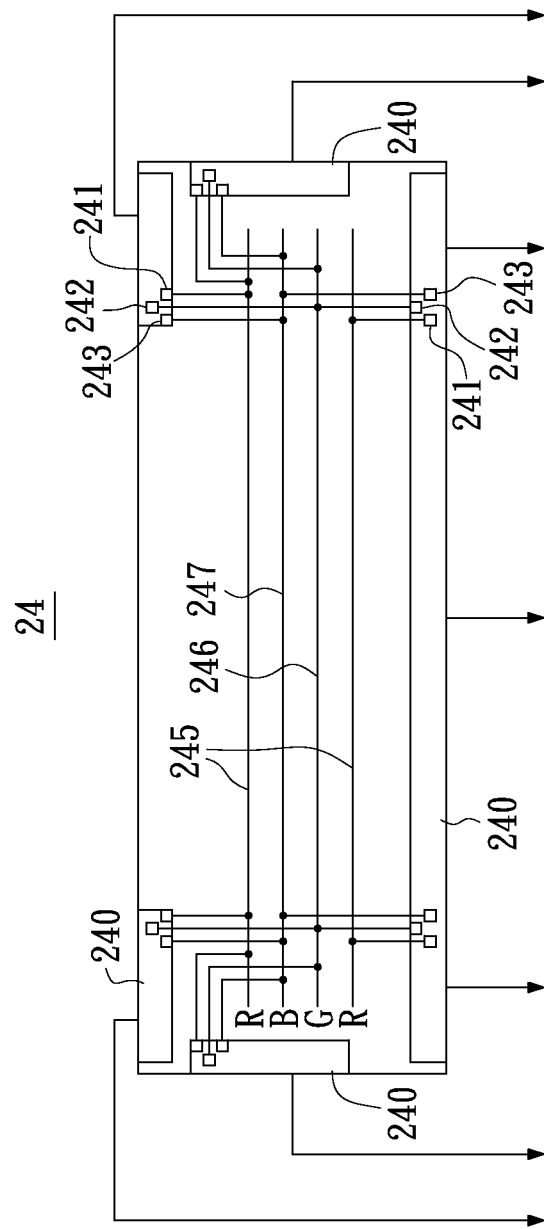
FIG. 7 is an enlarged view of any one of source driver IC chips in FIG. 2.

Referring to FIG. 7, being an enlarged view of any one of the source driver IC chips 24 in FIG. 2 before completing a signal wire connectivity test. As illustrated in FIG. 7, the output terminals 240 of the source driver IC chip 24 are arranged at four sides of the source driver IC chip 24, to output the respective red (R), green (G) and blue (B) signals of the data signals to the display area 21 through the first conductive wires 23b electrically coupled thereto. In FIG. 7, each solid rectangle represents one or multiple output terminals 240. The four sides include two long sides and two short sides. The output terminals 240 include a plurality of first output terminals 241, a plurality of second output terminals 242 and a plurality of third output terminals 243. The first output terminals 241 constitute a first output terminal group to output the red signal. The second output terminals 242 constitute a second output terminal group to output the green signal. The third output terminals 243 constitute a third output terminal group to output the blue signal.

The source driver IC chip 24 in FIG. 7 further includes two first color short-circuit lines 245 (e.g., red short-circuit lines), one second color short-circuit line 246 (e.g., green short-circuit line) and one third color short-circuit line 247 (e.g., blue short-circuit line). The two first color short-circuit lines 245 are electrically coupled to the first output terminal group, the second color short-circuit line 246 is electrically coupled to the second output terminal group, and the third color short-circuit line 247 is electrically coupled to the third output terminal group. The first color short-circuit lines 245, the second color short-circuit line 246 and the third color short-circuit line 247 are parallel to one another. Conductive wires (not labeled) electrically coupled between the two first color short-circuit lines 245 and the first output terminal group do not cross the second color short-circuit line 246 and the third color short-circuit line 247.

It is indicated that, after completing the signal wire connectivity test, the connections of the first, second and third color short-circuit lines 245, 246, 247 with the first, second and third output terminal groups of the source driver IC chip 24 are cut off via laser cutting.

Figure 8:
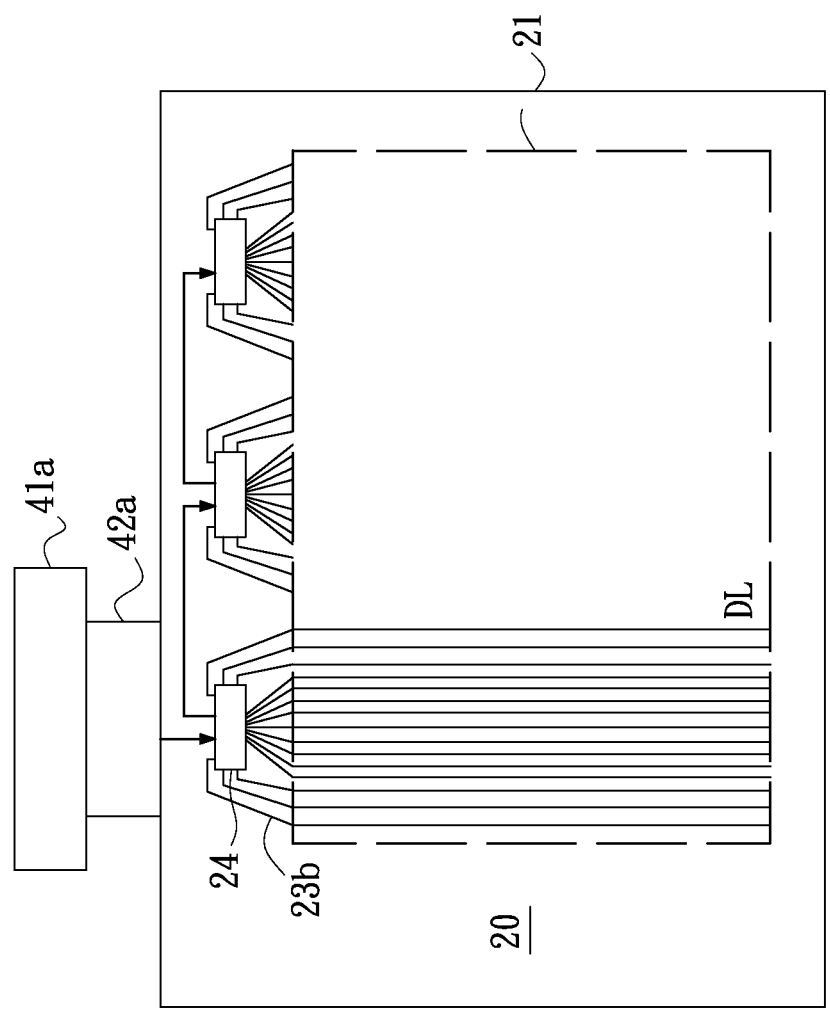
FIG. 8 shows an example of multiple source driver IC chips in FIG. 2 are connected in cascade.

Referring to FIG. 8, showing an example of the source driver IC chips 24 in FIG. 2 are connected in cascade. As illustrated in FIG. 8, an external printed circuit board 41a provides a power signal to the cascade-connected source driver IC chips 24 through a flexible printed circuit board 42a. The flexible printed circuit board 42a is electrically coupled between the printed circuit board 41a and the glass substrate 20. The printed circuit board 41a generally has a timing controller and a DC-to-DC converter disposed thereon. The DC-to-DC converter is for providing the power signal. In this embodiment, the timing controller and the DC-to-DC converter are illustrated. In addition, the printed circuit board 41a and the above-mentioned printed circuit board 31a can be the same printed circuit board.

Figure 9:
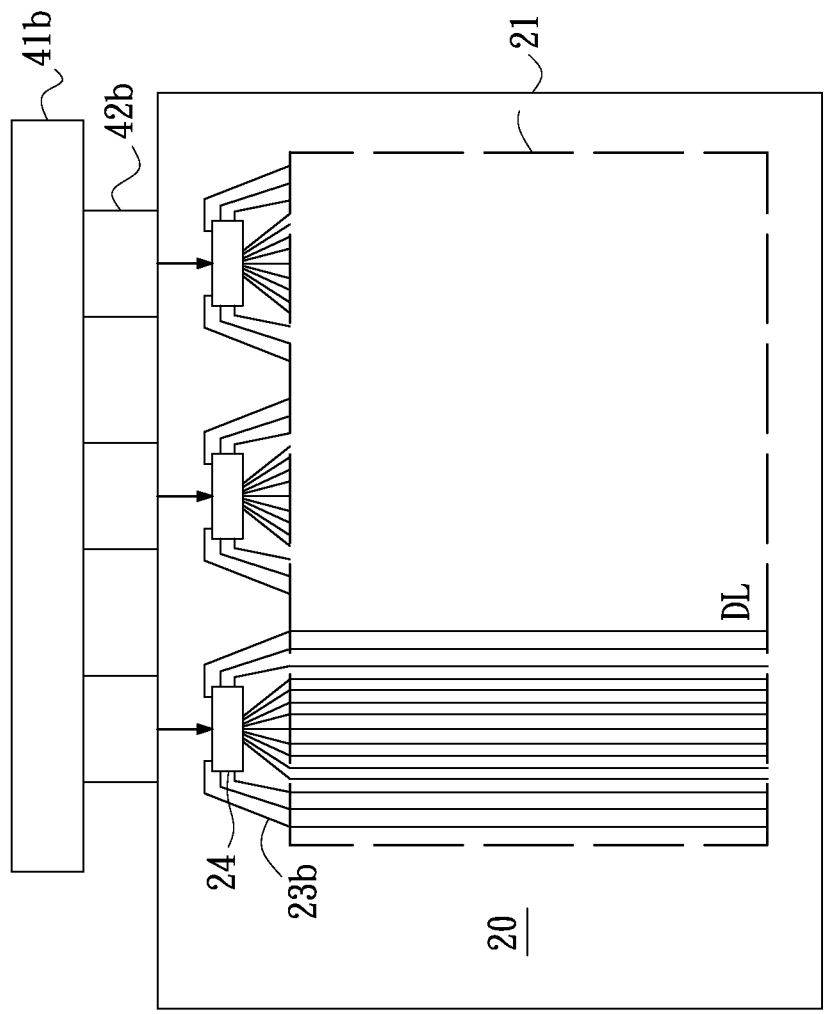
FIG. 9 shows another example of multiple source driver IC chips in FIG. 2 are connected in parallel.

Referring to FIG. 9, showing another example of the source driver IC chips 24 in FIG. 2 are connected in parallel. As illustrated in FIG. 9, an external printed circuit board 41b provides power signals to the parallel-connected source driver IC chips 24 through a plurality of flexible printed circuit boards 42b. The flexible printed circuit boards 42b are electrically coupled between the printed circuit board 41b and the glass substrate 20. The printed circuit board 41b has a circuit configuration similar to that of the printed circuit board 41a, and thus will not be repeated herein.

Figure 10:
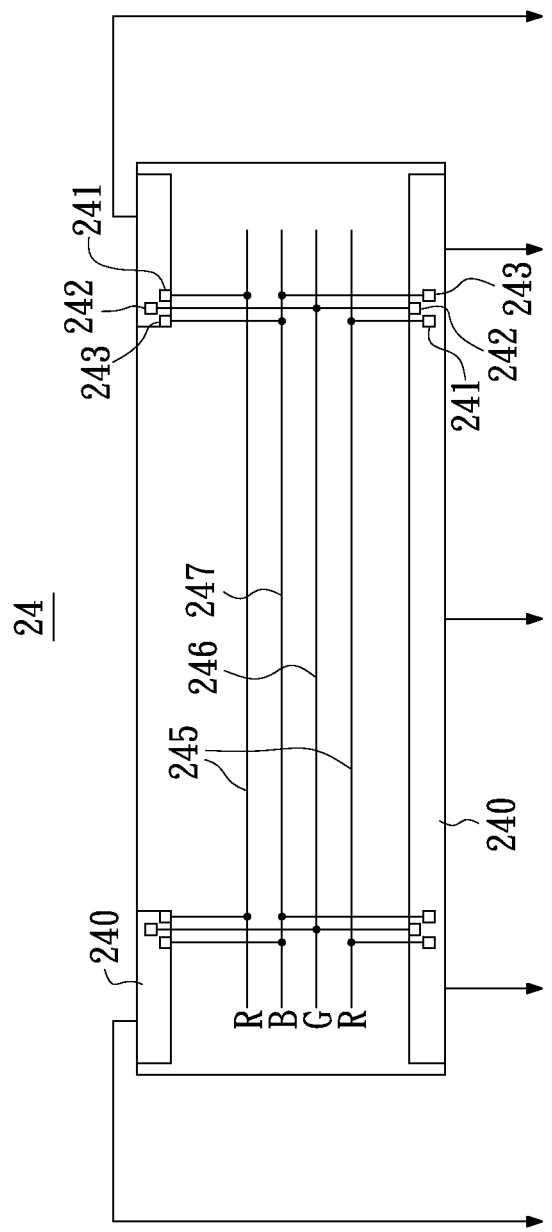
FIG. 10 is an enlarged view of another source driver IC chip in accordance with an embodiment of the present invention.

Referring to FIG. 10, the output terminals 240 of each of the source driver IC chips 24 in accordance with the present invention are not limited to be arranged at four sides of the source driver IC chip 24, and can be only arranged at two long sides of the four sides as illustrated in FIG. 10, or three sides (e.g., two short sides and one long side) of the four sides, or one short side and one long side of the four sides. In FIG. 10, each solid rectangle represents multiple output terminals 240.

It is indicated that the amount of the gate driver IC chips 22 in accordance with the embodiment of the present invention is not limited to two as illustrated in FIG. 2, and can be adjusted according to the requirement of practical applications. The gate driver IC chips 22 are not limited to be arranged at single side of the glass substrate 20, and can be arranged at double sides of the glass substrate 20 instead. In addition, the amount of the source driver IC chips 24 in accordance with the embodiment of the present invention is not limited to three as illustrated in FIG. 2, and can be adjusted according to the requirement of practical applications. The first, second and third output terminal groups of each of the source driver IC chips 24 are not limited to outputting the respective red, green and blue signals, and can be configured to output any one of red, green and blue signals as long as the outputted color signals are different from one another.

In summary, in the above-mentioned embodiments of the present invention, since output terminals of the IC chip are arranged at at least two of the multiple sides thereof, facilitating the efficient utilization and miniaturization of the IC chip, and the drawback of a waste of chip area resulting from excessive length for the IC chip in the prior art can be overcome. When the IC chip is applied to a glass substrate of flat display panel, an increased miniaturization for the glass substrate can be achieved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display integrated circuit chip for receiving and outputting a first color signal, a second color signal and a third color signal, comprising:

a plurality of sides;

a plurality of output terminals arranged at at least two of the sides, each of the output terminals is for outputting one of the first color signal, the second color signal and the third color signal;

two first color short-circuit lines parallel disposed in the integrated circuit chip and electrically coupled to a first output terminal group of the output terminals which is for outputting the first color signal;

one second color short-circuit line disposed between and parallel with the first color short-circuit lines, wherein the second color short-circuit line is electrically coupled to a second output terminal group of the output terminals which is for outputting the second color signal; and one third color short-circuit line disposed between and parallel with the first color short-circuit lines, wherein the third color short-circuit line is electrically coupled to a third output terminal group of the output terminals which is for outputting the third color signal;

wherein conductive wires electrically coupling the first color short-circuit lines with the first output terminal group do not cross the second and third color short-circuit lines.

2. The display integrated circuit chip as claimed in claim 1, wherein the sides comprise two long sides and two short sides.

3. The display integrated circuit chip as claimed in claim 2, wherein the output terminals are arranged at the two long sides.

4. The display integrated circuit chip as claimed in claim 2, wherein the output terminals are arranged at the two short sides and one of the two long sides.

5. The display integrated circuit chip as claimed in claim 2, wherein the output terminals are arranged at one of the two long sides and one of the two short sides.

* * * * *